Dec. 4, 1923.
R. RÜDENBERG
ALTERNATING CURRENT LINE
Filed Dec. 2, 1920
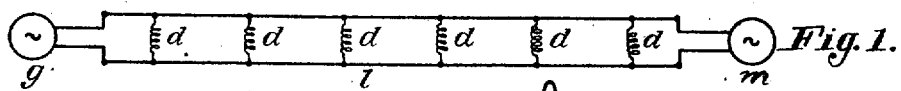
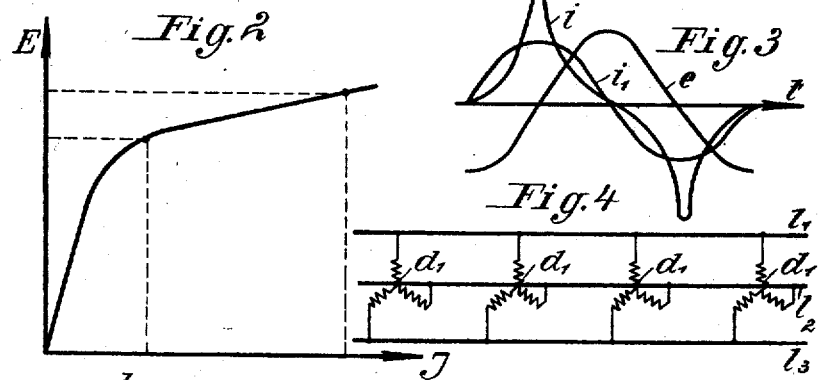
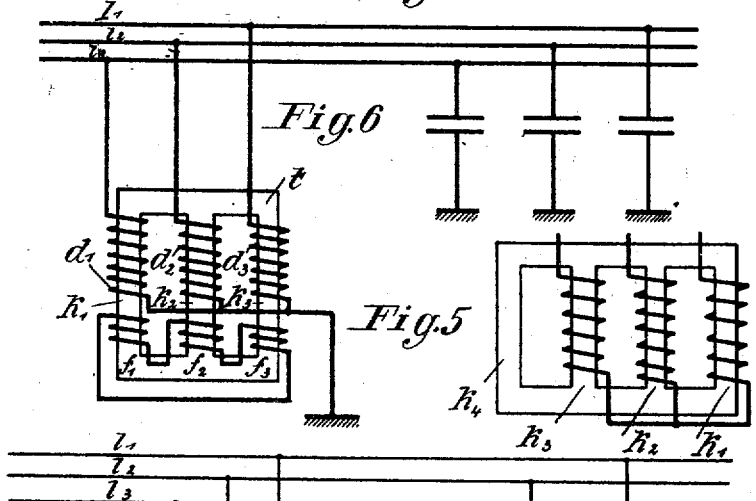
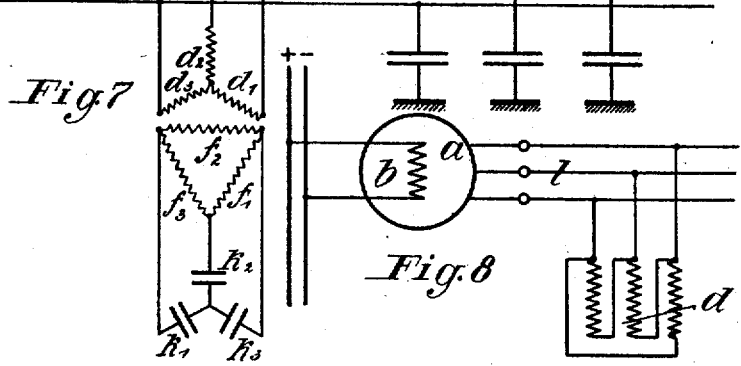
Inventor
Reinhold Rüdenberg
by Knight Bro.
attorneys Patented Dec. 4, 1923.

1,475,968

UNITED STATES PATENT OFFICE.

REINHOLD RÜDENBERG, OF BERLIN-GRUNEWALD, GERMANY, ASSIGNOR TO SIEMENS-SCHUCKERTWERKE GESELLSCHAFT MIT BESCHRÄNKTER HAFTUNG, OF SIEMENS-STADT, NEAR BERLIN, GERMANY, A GERMAN CORPORATION.

ALTERNATING-CURRENT LINE.

Application filed December 2, 1920. Serial No. 427,929.

*To all whom it may concern:*

Be it known that I, REINHOLD RÜDENBERG, a citizen of the German Empire, residing at Berlin-Grunewald, Germany, have invented certain new and useful Improvements in Alternating-Current Lines (for which I have filed applications in Germany, Nov. 26, 1918; Dec. 20, 1918; June 13, 1919; July 14, 1919; July 22, 1919; England, Jan. 30, 1920; June 18, 1920; France, Feb. 11, 1920, Patent No. 509,795; Sweden, Jan. 7, 1920; Norway, Feb. 17, 1920; Switzerland, Feb. 18, 1920; Austria, Jan. 13, 1920), of which the following is a specification.

Long distance alternating current lines, irrespectively as to whether in the form of overhead lines or cables, have the disadvantage that, owing to the capacity of the lines relatively to each other, as well as toward the earth, powerful charging currents arise which increase with the length of the line, and which eventually, in the case of long lines, assume the magnitude of the working currents, or even become larger than these. Such charging currents which must be supplied by current generators arranged either at the beginning or at the end of the line, entail considerable losses of energy, which very much impair the efficiency of the entire line.

It is already known that charging currents may be compensated by arranging choking coils along the various sections of the line, these coils being suitably connected between the variably phased lines. Each of these coils will at its point compensate the charging currents arising in its vicinity, so that they are prevented from flowing across long sections to the end of the line. On the other hand, however, choking coils of this kind increase to a very considerable degree the tendency towards resonance as soon as there happen to exist within the lengths of these line sections one or a plurality of wave lengths four times the section lengths. In such an event, the lines incline to resonance conjointly with the alternating current voltage impressed, so that a large local increase of voltage results.

The natural length of an electromagnetic wave in no-load lines with an alternating current of 50 periods per second amounts to about 6000 kilometers in the case of overhead lines, and about 4000 kilometers in that of cables. The shortest dangerous lengths hence amount to about 1500 kilometers in the case of no-load overhead lines, and to about 1000 kilometers in case of no-load cables. By the interposition of choking coils, the rapidity of diffusion of the alternating currents is reduced, and hence the length of the wave, and the dangerous length of line is likewise shortened. Thus, by the interposition of choking coils, there are indeed dangerous lengths of line created which are well within ranges such as occur in practical installations, and in which a flash-over is thus likely to occur.

Of course it would be possible to so choose the lengths of the natural waves that they will differ from a four-fold length of the line or an integral portion thereof. However, in that case the selection made can only be effective for certain definite working conditions; it will be inapplicable the moment the network of mains is changed by switching on or off individual line sections.

The present invention purposes to prevent these occurrences by providing the choking coils, serving to reduce the capacitative charging currents in alternating current systems, and disposed in parallel to the lines, with an iron core. This core is dimensioned so that, in the case of normal voltage, it is highly saturated whereby the choking coil obtains a characteristic of saturation to be explained hereinafter, up to the present lines, the induction of which is artificially increased by the interposition of choking coils, were always arranged so as to maintain a proportionate relation between current and voltage, alone for the purpose of being able to theoretically control the conditions created.

Various arrangements in accordance with the subject matter of this invention are shown diagrammatically by way of example in the drawings accompanying this specification and forming part thereof.

In these drawings:

Fig. 1 diagrammatically illustrates the invention applied to a single phase alternating current distributing system.

Fig. 2 represents a saturation curve.

Fig. 3 represents voltage and current curves.

Fig. 4 diagrammatically illustrates the invention applied to a three phase alternating current system.

Fig. 5 illustrates a particular form of magnet core.

Figs. 6, 7 and 8 illustrate modified arrangements of choking coils employed in three phase systems.

In Fig. 1, $g$ indicates an alternating current generator; $l$ the network, $m$ the point of current consumption. At various points of the network there are arranged choking coils $d$ which are each provided with an iron core, highly saturated at normal voltage to an extent at which the relation between the voltage and the current exists as is illustrated by the characteristic curve, Fig. 2, between the points $a$ and $b$.

Owing to these highly saturated iron cores there now no longer prevails a particular natural wave length for the system, so that there can also no longer arise an acute resonance. Assuming now that the choking coils happen to be in a certain condition, in which there exists a certain inductance, and accordingly a definite natural wave of the line which again may happen to be equal to four times, or, perhaps only to one-half the length of the line. Then it will be found that the voltage of the line will heavily increase, and that the current will rise accordingly. However, in the meanwhile the choking coils absorb disproportionately larger currents than will actually correspond to the increase in voltage, as will be seen from Fig. 2, so that the inductance of the choking coil will drop. The natural wave length of the line is now altered, and the resonance disturbed, so that any considerable local increase of voltage is now rendered altogether impossible.

Since otherwise the choking coils with their saturated iron cores will produce even in the case of great variations of current only slight variations of voltage, a change in the voltage of the system will be forcibly kept within small limits throughout the entire extent of the network of the mains, and cannot vary beyond a certain predetermined degree.

It follows that by means of the arrangement in accordance with this invention, alternating currents of any conventional frequency may be transmitted across lines of any length whatsoever without causing, on the one hand, great losses of energy owing to the charging current and, on the other hand, an inadmissible increase of voltage owing to resonance. In certain cases, the choking coils may also be interconnected in the line.

In order to obtain a characteristic, such as is shown in Fig. 2, there is required in the case of a sinusoidal voltage ($e$, Fig. 3) a sinusoidal wattless current such as is likewise shown at $i_1$ in dependency upon the time $t$ in Fig. 3. A sharp curved wattless current of this description will contain beside the first harmonic $i$, higher harmonics, in particular the third, apt to lead to interruptions of service owing to phenomena due to charging or owing to resonance with capacities present within the network.

However, there is the possibility in connection with three phase current systems— and this constitutes the principle subject matter of my present invention—of suppressing the third and higher harmonics of the current, or of the voltage, or of both, which might be set up in the network by interlinking the choking coils either magnetically or electrically. This modification is shown in Fig. 4, in which the current of the third harmonic is suppressed by interposing between the three phases $l^1$, $l^2$, $l^3$ of a three-phase alternating current network choking coils $d^1$ arranged in star connection. The said coils may be arranged on separate cores, or else also upon a common iron frame. In the latter case it will be found expedient to provide the frame in the manner known with a fourth core not wound, to enable the field of the third harmonic to develop, and thereby suppressing the said harmonic in the voltage of the system. Fig. 5 illustrates an arrangement of this kind, $k^1$, $k^2$, $k^3$ representing the wound cores of the three choking coils and $k^4$ the fourth core not wound.

The interlinking of the choking coils of the polyphase system may also be effected in a different manner. If, for example, the choking coils be arranged in a delta connection, whether on a common iron frame or upon separate cores, one for each coil, the currents of the third harmonic will flow within the enclosed polyphase system; they will thus be suppressed for the network. In the case of other than three-phase systems suitable connections may readily be arranged. In a like manner, other methods of interlinking the choking coils may be resorted to, and which will always be applicable for the purpose held in view provided they are but able to suppress the third and higher harmonics of the network.

In the form of execution hereinbefore described with reference to Fig. 5, the choking coils are disposed on a common iron frame, provided with a fourth core having no winding for the purpose of enabling the field of the third harmonic to develop itself, and thus to secure the suppression of said harmonic relatively to the voltage of the system. An arrangement of this kind is apt to require transformers of an abnormal size.

In order to enable the use of transformers of average size (without the danger of producing eddy current stray fields) to secure satisfactory sinusoidal currents or voltages in the choking coils of the three-phase alternating current, there may be employed in accordance with this invention, average size three-shank iron frames, provided that— and this forms another object of my invention—there be arranged on the same shanks a secondary winding in delta connection, beside the primary winding disposed in star connection and connected to the phase of the network.

An arrangement of this kind is illustrated in Fig. 6, in which $l_1$, $l_2$, $l_3$ indicate the network of the mains to which the primary windings $d^1$ disposed in star connection and appertaining to the choking coil $t$, are connected. On the cores $k_1$, $k_2$, $k_3$ of the choking coil are disposed in delta connection windings $f_1$, $f_2$, $f_3$ acting as secondary winding.

In this secondary winding, which is suitably constructed so that it possesses but a relatively small cross section of copper, there are produced currents having a threefold cycle, which supplement the sinusoidal wattless currents of the main winding to form a total wattless current of such character that the magnetic flux of all three shanks of the iron frame is enabled, despite a high degree of saturation, to develop in an approximately sinusoidal form. A return transmission by aid of the fourth shank, such as is shown in Fig. 4, is no longer required in this case.

A further substantial advantage characteristic of this arrangement consists in the possibility which it now affords of grounding the zero point, without the danger of causing the development of powerful third harmonic currents, in consequence of the action of the distorted phase voltage between the neutral point and the network capacities shown in the drawing. The reason is that the choking coil in accordance with this invention carries, when fed by three-phase alternating current both at its terminals, as also in each of its phase windings, practically sinusoidal voltages and currents. By grounding the neutral point, as is now rendered possible, static charges of the line are enabled to flow off; according to requirement the self-induction may be interposed in the earth connection, or else there may be disposed in the earth connection, or even in any other way in combination with the transformer, the well-known earth connection coils, or other devices for suppressing arcs caused by earthing and occurring in the event of line defects.

This form of arrangement, according to which by means of the secondary winding disposed in delta connection currents and voltages of a three-fold frequency are suppressed which might arise in consequence of the magnetic saturation of iron in the choking coil, may be further developed so as to render it possible to suppress by its means also currents and voltages of the higher harmonics which are likewise created to a certain extent by the saturation of iron. To this end there are connected to the circuit of the secondary winding disposed in delta connection, capacitative elements which are suitably connected to the said winding to form resonance circuits for higher harmonics. If, for instance, the fifth and seventh harmonics are to be suppressed, it will prove expedient to tune the capacitative elements, connected to the circuit of the winding disposed in delta connection, with the active inductance of said winding to about a six-fold frequency of the current of the network. In the winding disposed in delta connection there will then be caused to flow, besides the internal third harmonic periodic currents, also powerful currents of a five to seven-fold frequency which, owing to the resonance, will develop in the presence of slight electromotive forces, and which will therefore produce a substantially sinusoidal magnetic flux in each shank, and hence also correspondingly sinusoidal currents in the primary winding of the saturated choking coil.

In such an arrangement there prevails both a sinusoidal voltage, as also a sinusoidal current at the terminals of the choking coil, and the ampere windings of high frequency required by the characteristic curve of the iron core are almost entirely supplied by the secondary winding disposed in delta connection.

A form of connection intended to realize this feature of my invention is shown in Fig. 7, in which $l^1$, $l^2$, $l^3$ indicate the network of the mains, to which are connected the primary windings $d^1$, $d^2$, $d^3$ of the choking coil, which are disposed in star connection. The secondary windings $f^1$, $f^2$, $f^3$ are arranged in delta connections. Disposed at the terminals of the last-mentioned winding are the condensers $k^1$, $k^2$, $k^3$ which are tuned to resonance with the inductance of the secondary winding.

It will not always be found necessary to load said secondary winding with an outer capacity, but a rather similar effect may be obtained by arranging a suitable connection such that the individual parts constitute large internal capacities relatively to each other. This capacity may be of a magnitude sufficient to form, conjointly with the inductance of the winding disposed in delta connection, the resonance circuit for the sixth, or otherwise desired higher harmonic.

As hereinbefore set forth, the choking coils, the iron core of which in case of normal voltage is saturated beyond the bend of its characteristic curve will absorb disproportionately larger currents than actually corresponds to the increase of voltage, so that as Fig. 2 shows, the inductance of the choking coil will drop. In order to obtain even for very slight fluctuation of voltage the greatest possible fluctuation of the wattless current, a closed iron core having no air gap is very useful, while the choking coil, for its part, is so dimensioned that in the case of the current variation attaining a useful value, say in proportion of 1:10, the variation in voltage will not exceed 30 per cent. To this end the induction of the sheet iron plate in the case of normal voltage is selected at 15500 Gauss. If, for an average transformer plate, the induction limit were to be fixed at a lower figure, say for a change of the wattless current from 9 to 90 A W/cm, then within the extent of this induction there would be caused to arise a change of induction, and therewith of voltage, of about 60 per cent relatively to the lower voltage, a fluctuation of voltage of undesirable magnitude. Again, if the lower limit of the induction be fixed at 15500 Gauss, an admissible fluctuation of voltage of about 30 per cent will be obtained. If, on the other hand, the rate of induction be fixed higher, say at 18000 Gauss, or somewhere between 18300 and 22000 Gauss, then the change of voltage will only amount to about 20 per cent.

In this case the choking coil, the iron core of which at normal voltage is saturated beyond the bend of its characteristic curve, may now be further employed to remove the following difficulties.

In alternating current arrangements for strong current service there frequently arise extreme capacitative loads, for example, when extensive cable lines are connected thereto, or even big overhead lines, when the charging currents produced by the capacity will react on the generators. Now, as in the case of normal loads the current will generally lag behind the voltage, so that the displacement of phases will likewise be a lagging one, the wattless current being supplied by the generator compensating the leading charging current. In the case of weak loads, on the other hand, and above all in the event of no load, the displacement of phases leads considerably, so that under certain circumstances a capacitative charging current is apt to arise. This latter will then act as an additional magnetizing means for the generator; it will reinforce its field, and hence its terminal voltage. Under certain conditions, in particular when owing to some fault of service the generator happens to be overloaded with charging current, the no load voltage will prove a multiple of that prevailing at normal load.

If, however, the aforementioned choking coil, the iron core of which at normal voltage is saturated beyond the bend of its characteristic curve is connected in circuit, preferably, and close to the terminals of the generator, then these disadvantages are avoided.

A suitable arrangement to effect this is disclosed in Fig. 8, in which $a$ indicates the generator with a device $b$ for exciting the continuous current, while $c$ is the network of the three-phase current. A choking coil $d$ having a highly saturated iron core is connected to the terminal of the generator.

If the voltage is to increase for a considerable degree, the saturated choking coil will absorb a rapidly increasing, lagging wattless current, and will thereupon compensate a considerable portion of the leading charging current. The increase of voltage at no load is thus restricted to a minimum. The degree of saturation to prevail in the choking coil is made dependent upon the values which the increase of voltage still represents at no load, so that, for instance, it will be readily possible that the entire fluctuations of voltage between no load and full load, which without the use of the choking coil in accordance with this invention might amount to several hundred per cent, will not essentially exceed a value of 25-30 per cent.

As shown in Fig. 8, the choking coil is suitably disposed in delta, or in any other equivalent connection, so that it can not give rise to any high harmonic currents and voltages, which might injuriously react upon the network.

In the event of an energy transformer being interposed between the generator and the network of the mains for the purpose of altering the voltage, then said transformer may be employed to act as a choking coil having a highly saturated iron core by so dimensioning its size that its own iron core will be highly saturated.

I claim:—

1. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame and being connected with the different phases in star connection, and secondary windings on said shanks connected in delta connection.

2. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame and being connected to the different phases in star connection, and secondary windings of relatively low copper cross-section on said shanks, connected in delta connection.

3. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame and being connected to the different phases in star connection, and secondary windings on said shanks connected in delta connection, and capacitative elements connected in circuit with said secondary windings.

4. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame and being connected to the different phases in star connection, and secondary windings on said shanks connected in delta connection, and condensers disposed at the terminals of said secondary windings.

5. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame, and being connected to the different phases in star connection, and secondary windings on said shanks connected in delta connection, the individual parts of said secondary windings having a substantial internal capacity relatively to each other.

6. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame and being connected to the different phases in star connection, and secondary windings on said shanks connected in delta connection, capacitative elements connected to the circuit of said secondary windings to form resonance circuits for suppressing higher harmonics of the current and voltage.

7. An alternating current power line comprising in combination a plurality of choking coils interlinked with each other, one coil being provided for each phase of the line, a multiple shank iron frame having said coils placed on its shanks, and having said shanks saturated at normal voltage beyond the bend of their characteristic curve, primary windings disposed on the shanks of said frame and being connected to the different phases in star connection, and secondary windings on said shanks connected in delta connection, capacitative elements connected to the circuit of said secondary windings, said elements being tuned to the sixth harmonic with the effective inductance of said delta winding in order to suppress the fifth and seventh harmonic.

In testimony whereof I affix my signature.

REINHOLD RÜDENBERG.